United States Patent
Lv et al.

(10) Patent No.: US 11,409,092 B2
(45) Date of Patent: Aug. 9, 2022

(54) PARALLEL MULTI-REGION IMAGING DEVICE

(71) Applicant: HUAZHONG UNIVERSITY OF SCIENCE AND TECHNOLOGY, Hubei (CN)

(72) Inventors: Xiaohua Lv, Hubei (CN); Shaoqun Zeng, Hubei (CN); Qinglei Hu, Hubei (CN); Pei Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 784 days.

(21) Appl. No.: 16/304,305

(22) PCT Filed: Sep. 18, 2018

(86) PCT No.: PCT/CN2018/106072
§ 371 (c)(1),
(2) Date: Nov. 26, 2018

(87) PCT Pub. No.: WO2020/034299
PCT Pub. Date: Feb. 20, 2020

(65) Prior Publication Data
US 2021/0223525 A1    Jul. 22, 2021

(30) Foreign Application Priority Data

Aug. 17, 2018   (CN) .......................... 201810937498.2

(51) Int. Cl.
*G02B 21/00* (2006.01)
*G02B 21/02* (2006.01)
*H04N 5/225* (2006.01)

(52) U.S. Cl.
CPC ....... *G02B 21/0032* (2013.01); *G02B 21/008* (2013.01); *G02B 21/0036* (2013.01); *G02B 21/02* (2013.01); *H04N 5/2256* (2013.01)

(58) Field of Classification Search
CPC .............. G02B 21/0032; G02B 21/02; G02B 21/0036; G02B 21/008; H04N 5/2256
See application file for complete search history.

(56) References Cited

U.S. PATENT DOCUMENTS 4,634,241 A * 1/1987 Kohayakawa ......... A61B 3/132
                                                      359/473
5,694,216 A * 12/1997 Riza .................... G01B 9/02007
                                                      356/485

(Continued)

FOREIGN PATENT DOCUMENTS

CN           202975600     * 11/2012 ............... G03H 1/12

*Primary Examiner* — Philip P. Dang
(74) *Attorney, Agent, or Firm* — JCIPRNET

(57) ABSTRACT

The parallel multi-region imaging device includes a multi-focus generation module, a spatial demodulation module, and a detection module. The multi-focus generation module is configured to modulate illumination light to generate a plurality of focuses in an object-side, and to form a plurality of different illumination regions, thereby generating multiple paths of signal light through a sample to be imaged. The spatial demodulation module is configured to make spatial energy distribution of each path of signal light no longer overlap or make an overlapping region smaller than a target requirement. The detection module is configured to independently detect each path of signal light passing through the spatial demodulation module, so as to implement parallel multi-region imaging.

8 Claims, 9 Drawing Sheets

(56) References Cited

U.S. PATENT DOCUMENTS

| | | | | |
|---|---|---|---|---|
| 6,485,413 | B1* | 11/2002 | Boppart | A61B 1/07 600/478 |
| 6,858,852 | B2* | 2/2005 | Wolleschensky | G01J 3/2803 356/326 |
| 6,882,477 | B1* | 4/2005 | Schattenburg | G03F 7/70408 359/35 |
| 6,891,613 | B2* | 5/2005 | Wolleschensky | G02B 21/0064 359/368 |
| 7,213,920 | B2* | 5/2007 | Matsui | H04N 5/7416 359/489.07 |
| 7,273,279 | B2* | 9/2007 | Kobayashi | H04N 9/3105 353/69 |
| 7,379,191 | B2* | 5/2008 | Brooks | G01B 9/02065 356/515 |
| 7,482,573 | B2* | 1/2009 | Oka | G11B 7/1263 359/223.1 |
| 7,502,100 | B2* | 3/2009 | Kawano | G01B 11/24 356/138 |
| 7,561,326 | B2* | 7/2009 | Funk | G02B 21/0044 359/368 |
| 7,714,997 | B2* | 5/2010 | Shibata | G01N 21/4788 356/237.4 |
| 7,876,450 | B2* | 1/2011 | Novotny | B82Y 35/00 356/491 |
| 9,200,887 | B2* | 12/2015 | Potsaid | G01B 9/02055 |
| 9,271,643 | B2* | 3/2016 | Bower | A61B 3/102 |
| 9,471,994 | B2* | 10/2016 | Dowski, Jr. | G02B 27/0075 |
| 9,785,047 | B2* | 10/2017 | Liu | G03F 7/00 |
| 9,939,381 | B1* | 4/2018 | Kimmel | G02B 21/008 |
| 9,989,755 | B2* | 6/2018 | Fujimura | G02B 26/04 |
| 10,649,136 | B2* | 5/2020 | Weirich | G02B 6/02361 |
| 10,838,190 | B2* | 11/2020 | Faris | G01N 21/64 |
| 11,041,760 | B2* | 6/2021 | Shiozawa | G01J 3/0208 |
| 2004/0075894 | A1* | 4/2004 | Shafer | G02B 17/0892 359/857 |
| 2006/0256289 | A1* | 11/2006 | Fukuzaki | G03B 21/14 348/E9.027 |
| 2014/0268149 | A1* | 9/2014 | Zavislan | G01N 21/23 356/365 |
| 2017/0056243 | A1* | 3/2017 | Schuele | A61B 3/113 |
| 2018/0006729 | A1* | 1/2018 | Ashizawa | H04B 10/614 |
| 2018/0084232 | A1* | 3/2018 | Belenkii | H04N 13/324 |
| 2018/0209905 | A1* | 7/2018 | Iketaki | G02B 21/14 |

* cited by examiner

PARALLEL MULTI-REGION IMAGING DEVICE

CROSS-REFERENCE TO RELATED APPLICATION

This is a 371 application of the International PCT application serial no. PCT/CN2018/106072, filed on Sep. 18, 2018, which claims the priority benefits of China Application No. 201810937498.2 filed on Aug. 17, 2018. The entirety of each of the above-mentioned patent applications is hereby incorporated by reference herein and made a part of this specification.

BACKGROUND OF THE INVENTION

1. Field of the Invention

The present invention belongs to the field of imaging, and more particularly relates to a parallel multi-region imaging device.

2. Description of Related Art

Imaging techniques are used to acquire spatial information of a sample. A wide-field imaging technique uses area array detection that can acquire optical information in an imaged region at an exposure time, and is a way of acquiring information in parallel. This way of acquiring information in parallel is fast (up to several thousand frames per second), but has no tomography capabilities. Tomography refers to acquisition of signals only in a certain thin layer (such as a focal plane) and shielding out signals in other regions (such as outside the focal plane) of a space, thereby reducing mutual interference of signals at different positions in the space, and further acquiring images with high-definition and high-contrast ratio. Imaging techniques with tomography capabilities mainly include a confocal imaging technique and a nonlinear imaging technique.

The confocal imaging technique sets a pinhole conjugated with an object point of an object space in an image-side of an imaging system, and enables illumination light to converge to the object point by a way of point illumination during imaging. A signal sent by the object point converges to the pinhole of the image-side and passes through the pinhole after being imaged by the imaging system, and then is received by a detector. Although some other regions outside the object point still have certain intensity of illumination light, signals sent by these positions cannot pass through the pinhole after passing through the imaging system, and cannot be received by the detector, thereby being blocked. The confocal imaging technique modulates the illumination intensity in the object space by point illumination, and then blocks the signals at other positions outside the object point through the pinhole, thereby obtaining a tomography effect. Since both illumination and detection are only for a certain point (not an infinitesimal point, but a very small three-dimensional region relative to the imaging range) in space. In order to acquire spatial information of the sample, a scanner is needed for point scanning and point-by-point detection, and signals of all points are spliced together to form an image.

The nonlinear imaging technique is an imaging technique based on nonlinear effect. Since the intensity of the nonlinear effect has a high-order nonlinear relationship with the space-time density of photons, there are many advantages that are different from the linear imaging technique, such as high resolution, optical tomography capabilities, and the like. Because of this nonlinear feature, the conventional nonlinear imaging technique requires focusing the illumination light to ensure that a sufficiently strong nonlinear effect can be produced within the focus, and then a scanner is used for scanning to form an image. Both of the above imaging techniques with tomography capabilities require scanning imaging, and scanning one surface or even a solid in space is time consuming. Imaging speed is critical to a dynamic process of sample observing. Even with high-speed scanners, since exposure is performed on points in space in a serial mode, the single-point exposure time is very limited, which is detrimental to signal intensity and a signal-to-noise ratio. In order to increase the imaging speed, a parallel detection mode can be introduced, such as expanding single-point scanning to multi-point simultaneous scanning or even line scanning. A large number of methods and techniques have been put into practice, but most of them only perform parallel detection on a lateral two-dimensional plane with respect to an optical axis of the imaging system. Parallel detection on spatial regions of different axial positions is difficult due to a reason of the object-image relationship. Although several methods for parallel detection on spatial regions of different axial positions have been developed in the industry, the limitations are large. One of the methods is to use pulsed illumination to make signals at different axial positions multiplex in time, and then demodulate acquired sequence signals for parallel imaging. The limitations of this method are: firstly, the method requires a high-speed signal acquisition system, because the gain-bandwidth product of a signal amplifier is limited, the high speed means a large bandwidth, resulting in small gain and difficulty in detecting weak light; and secondly, the sample needs to have a fast response to the illumination light, when the sample is a fluorescent sample, some of the fluorescent substances have a long fluorescence lifetime, which causes aliasing of the signals at different positions in time and further causes incapability of demodulation. A second one of the methods is to acquire superimposed signals of multiple spatial regions at different axial positions without distinction, and adopt an algorithm to perform image processing by using prior knowledge of the sample, thereby separating the superimposed signals into separate signals for each spatial region. The limitations of this method are as follows: firstly, it needs enough prior knowledge about the sample; and secondly, the signals in the space need to be sparse, and if the signals are relatively dense in space, the algorithm is prone to misjudgment.

SUMMARY OF THE INVENTION

In view of the above defects or improvement requirements of the prior art, the present invention provides a parallel multi-region imaging device, thereby solving the technical problems of difficulty in weak light detection, incapability of signal demodulation, high proneness to misjudgment and the like in the existing parallel multi-region imaging detection technique.

To achieve the above object, the present invention provides a parallel multi-region imaging device, including: a multi-focus generation module, a spatial demodulation module and a detection module;

the multi-focus generation module is configured to modulate illumination light to generate a plurality of focuses in an object-side, and to form a plurality of different illumination regions, thereby generating multiple paths of signal light through a sample to be imaged;

the spatial demodulation module is configured to make spatial energy distribution of each path of signal light to no longer overlap or make an overlapping region smaller than a target requirement; and the detection module is configured to independently detect each path of signal light passing through the spatial demodulation module, so as to implement parallel multi-region imaging.

Preferably, between the multi-focus generating module and the spatial demodulation module, the device further includes a spectroscope; and the spectroscope is configured to spatially separate the illumination light and signal light returned from the sample to be imaged, so that the illumination light output by the multi-focus generation module is propagated to the sample to be imaged and meanwhile the signal light returned from the sample to be imaged is propagated to the spatial demodulation module.

Preferably, a beam splitting method of the spectroscope includes splitting based on wavelength, splitting based on a polarization state, splitting based on a spatial position and attenuation type splitting.

Preferably, behind the spectroscope, the device further includes a scanning module; and the scanning module is configured to change a direction propagation, a degree divergence or a degree convergence of a beam, so that a focus of the object-side of an objective lens or a one-dimensionally focused line changes position in space, thereby performing scanning.

Preferably, a scanning member in the scanning module includes reflective type, transmissive type, or diffractive type.

Preferably, behind the scanning module, the device further includes a relay optical path; and the relay optical path is configured to implement pupil matching between the scanning module and an objective lens, so as to enable illumination light to enter the objective lens to illuminate the sample to be imaged within a target scanning range of the scanning module.

To sum up, compared with the prior art, the above technical solution conceived by the present invention can achieve following beneficial effects: the multi-focus generation module is used to generate multiple different illumination regions on the object space, so as to generate multiple paths of signal light. The spatial demodulation module is used to make spatial energy distribution of each path of signal light finally no longer overlap (or only have little overlap). The detection module is used to detect signals, thereby solving the technical problems of difficulty in weak light detection, incapability of signal demodulation, high proneness to misjudgment and the like in the existing parallel multi-region imaging detection technique.

DESCRIPTION OF THE EMBODIMENTS

In order to make the objects, technical solutions and advantages of the present invention more clear, the present invention will be further described in detail below with reference to the accompanying drawings and embodiments. It should be understood that the specific embodiments described herein are merely illustrative of the present invention and are not intended to limit the present invention. Further, the technical features involved in the various embodiments of the present invention described below may be combined with each other as long as they do not constitute a conflict with each other.

The present invention relates to a device for implementing parallel multi-region imaging using a certain structure. The imaging of the present invention refers to acquiring optical information in space.

Figure 1:
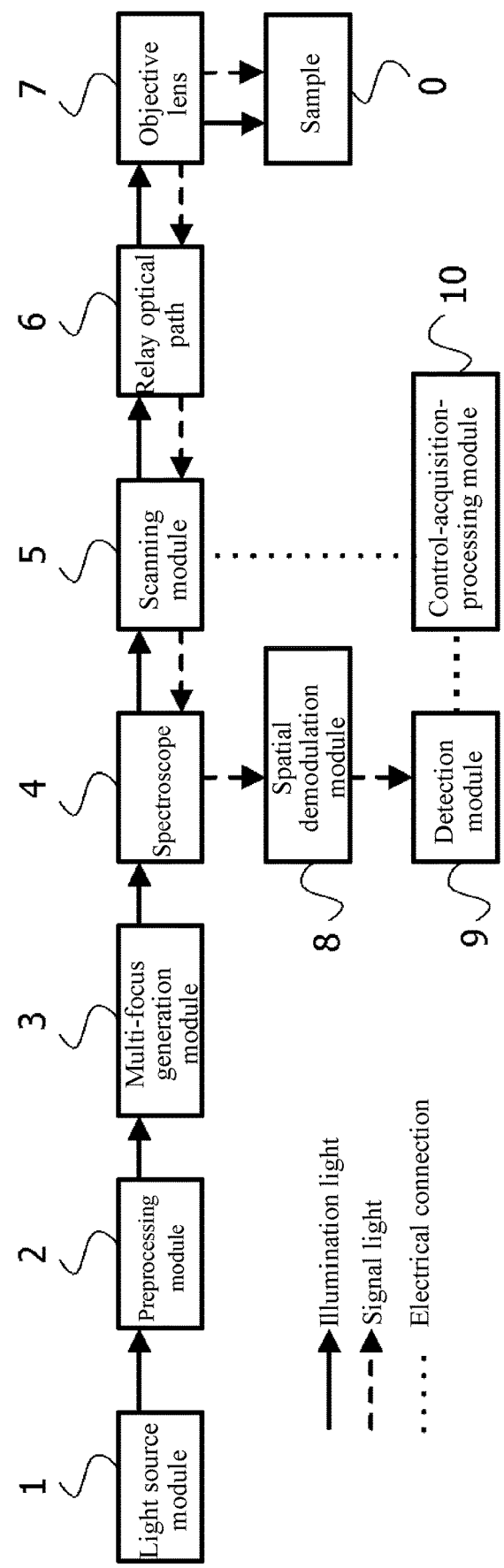
FIG. 1 is a structure diagram of a device according to an embodiment of the present invention.

FIG. 1 shows a structure diagram of a device according to an embodiment of the present invention, including a light source module 1, a preprocessing module 2, a multi-focus generation module 3, a spectroscope 4, a scanning module 5, a relay optical path 6, an objective lens 7, a spatial demodulation module 8, a detection module 9, and a control-acquisition-processing module 10.

The light source module is configured to generate illumination light. The light source may be an incoherent light source (such as a xenon lamp, a halogen lamp, a light emitting diode LED, etc.), also may be a coherent light source (such as a continuous laser, a pulsed laser, a super luminescent diode SLD, etc.), may be a broadband light source, and also may be a narrowband or monochromatic source, and the type of the light source including its emission spectrum is determined based on an imaged sample and imaging requirements. The light source module, in addition to the light source per se, may include other auxiliary devices, such as a collimating lens that collimates output light or a shaper that shapes an output light spot.

The preprocessing module is configured to process a beam, so that the beam meets the requirements of subsequent optical paths, such as implementing functions of beam expansion, polarization state adjustment, power attenuation, etc.

The multi-focus generation module is configured to modulate the illumination light, such that an object-side of an objective lens finally generates two or more focuses (or two or more one-dimensionally focused lines). The forms of the multi-focus generation module include: forming multiple beams by using a combination of beam splitters, then adjusting a light propagation direction and convergence or divergence degree by using a combination of lenses, and combining the multiple beams to form a multi-focus beam; generating a multi-focus beam by a light modulator, such a spatial light modulator (a device that performs array modulation on the intensity or phase of light) or a digital micromirror device (a device that performs digital modulation on the intensity of light), etc., and other auxiliary devices (such as dispersion compensation devices, apertures that block off unwanted diffraction orders, etc.); an acousto-optic deflector or an acousto-optic lens composed of an acousto-optic deflector; a phase plate with phase modulation processed by a transparent material, such as a diffraction grating, a Fresnel lens, a multi-focus phase plate, etc.; an intensity type passive diffraction device, such as a Daman grating, a Fresnel zone plate, etc.; a passive intensity and phase mixed diffraction device; a lens array; and other types of multi-focus generation methods. When the multi-focus generation module includes an active device (such as the above-mentioned spatial light modulator, digital micromirror device, acousto-optic deflector, etc.), the multi-focus generation module is controlled by the control-acquisition-processing module.

The spectroscope is configured to spatially separate the illumination light from signal light, such that they do not overlap in space and are far apart from each other, so that the illumination light output by the multi-focus generation module is propagated to the scanning module, and the signal light returned from the scanning module is propagated to the spatial demodulation module. A beam splitting method of the spectroscope includes splitting based on wavelength, splitting based on polarization state, splitting based on spatial position, and attenuation type splitting, etc. The splitting based on wavelength means that when the wavelengths of the illumination light and the signal light are different, a wavelength sensitive device is used to make propagation paths of the illumination light and the signal light not overlap. For example, when the wavelength of the illumination light is greater than the wavelength of the signal light, a long-pass dichroic mirror is used, so that the illumination light is transmitted through the dichroic mirror and the signal light is reflected by the dichroic mirror; or a short-pass dichroic mirror is used, so that the illumination light is reflected by the dichroic mirror and the signal light is transmitted through the dichroic mirror. The splitting based on polarization state means that when the illumination light and the signal light are both polarized light, a polarization sensitive device is used to make the propagation paths of the illumination light and the signal light not overlap. For example, when the polarization states of the illumination light and the signal light are perpendicular, a polarizing beam splitter may be used, such that one of the illumination light and the signal light is transmitted through the polarizing beam splitter and the other one thereof is reflected by the polarizing beam splitter. If the illumination light propagated to a sample and the signal light returned by the sample are polarized light but there is no significant difference in the polarization state, it is also possible to adjust the polarization states of the illumination light and the polarized light by inserting a polarization adjuster in a light path so as to make a difference, and then the polarization sensitive device is used for perform beam splitting. For example, when the light emitted by a light source is linearly polarized light and the signal light returned by the sample per se is in the same polarization state as the illumination light irradiated onto the sample, a quarter-wave plate can be added at a certain position in the optical path between the polarization sensitive device for beam splitting and the sample, and the polarization state of the light is rotated after the light passes through the quarter-wave plate twice, so that the illumination light and the signal light at the polarization sensitive device are different in polarization state and then split. When the quarter-wave plate is properly placed in position and angle, the polarization states of the signal light and the illumination light at the polarization sensitive device for beam splitting are just perpendicular, and at this time, using the polarizing beam splitter results in the best beam splitting effect. The splitting based on spatial position means that when the illumination light and the signal light do not completely overlap in space but are close to each other such that it is not convenient to separately detect the signal light, a lens, a telescope, a mirror, a prism, or other optical devices are used to amplify the difference between the illumination light and the signal light in the propagation path, thereby facilitating detection of the signal light. For example, when the beam directions of the illumination light and the signal light are very close to each other and indistinguishable but the spatial positions do not overlap, a reflective mirror can be utilized such that it does not affect the propagation of the illumination light but reflects the signal light, thereby clearly distinguishing the signal light and the illumination light in space. The attenuation type splitting means that the difference between the physical properties of the illumination light and the signal light is not utilized, and the illumination light and the signal light are spatially split by directly using a method of sacrificing energy. For example, a half mirror (or another transflective lens) is used, so that the illumination light is partially transmitted and partially reflected, the reflected part is not used, and only the transmitted part is used for illumination. The signal light is also partially transmitted and partially reflected, and only the reflected part of the signal light is detected. Although the illumination light also has a reflected part, since the illumination light and the signal light are reflected in different directions at this time, they can be spatially split; and of course, the selected transmission-reflection relationship can also be reversed (that is, the reflected part of the illumination light is used for illumination) as long as the final effect is that the propagation paths of the illumination light and the reflected light can be spatially split.

The scanning module is configured to change a propagation direction or a divergence degree (or a convergence degree) of a beam, so that the focus of the object-side of an objective lens (or a one-dimensionally focused line) changes position in space, thereby performing scanning. A scanning member in the scanning module includes a reflective type, transmissive type or diffractive type. Specifically, the types of scanning member include: a galvanometer mirror, a resonant mirror, a rotating polygon mirror, a piezoelectric galvanometer (a scanning member that is driven by piezoelectric ceramics and can rotate or translate the reflective mirror), a deformable mirror, an electro-optic deflector (a device that changes the beam propagation direction based on an electro-optic effect), an electro-optic lens (a device that changes the convergence degree and the divergence degree of the beam based on the electro-optic effect), an acousto-optic deflector (a device that changes the beam propagation direction based on the acousto-optic effect), an acousto-optic lens (a device that is formed by combining an acousto-optic deflector, and can change the convergence degree and the divergence degree of the beam and also can change the direction of main rays in the beam), a tunable acoustic-induced gradient index lens (a device that generates a refractive index profile in a medium based on mechanical vibrations, so as to implement phase modulation, thereby changing the convergence degree and the divergence degree of the beam), a variable-focus lens (a device that changes the shape of the medium based on the mechanical deformation or an electrowetting effect, thereby changing the convergence degree and the divergence degree of the beam), a spatial light modulator (a device that performs array modulation on the intensity or phase of light), a digital micromirror device (a device that performs digital modulation on the intensity of light), etc. Preferably, the scanning module uses a galvanometer mirror, a resonant mirror or a piezoelectric galvanometer to achieve better beam quality and transmission efficiency. When a scanning member having dispersion (for example, an acousto-optic deflector) is used, the scanning module further includes a dispersion compensating device whose function is to make the light having different wavelength components in the optical path to have identical direction and convergence or divergence degree in space.

The relay optical path is configured to implement pupil matching between the scanning module and the objective lens, that is, in a suitable scanning range of the scanning module, the illumination light can enter the objective lens as much as possible, so as to illuminate the sample. An ideal state of the pupil matching is that an exit pupil of the scanning module completely coincides with an entrance pupil of the objective lens (here, the entrance pupil and the exit pupil are relative to the propagation direction of the illumination light). If the exit pupil diameter of the scanning module (for a reflective scanner such as a galvanometer mirror, the exit pupil diameter is determined by the diameter of the illumination beam) is equivalent to the entrance pupil diameter of the objective lens, the magnification of the relay optical path is 1:1; and if the exit pupil diameter of the scanning module is not equivalent to the entrance pupil diameter of the objective lens, preferably, the relay optical path should have a certain lateral magnification effect such that the exit pupil diameter of the scanning module is equivalent to the entrance pupil diameter of the objective lens. Preferably, the relay optical path should use a 4f optical system, and the 4f optical system means that the relay optical path includes front and back lenses (here, the front and back are relative to the propagation direction of the illumination light), the front lens and the back lens are both positive lenses, the optical axes of them are coincident, and a back focal plane of the front lens coincides with a front focal plane of the back lens. Preferably, the exit pupil of the scanning module is located on the front focal plane of the front lens and coincides with a center, and the entrance pupil of the objective lens is located on the back focal plane of the back lens and coincides with the center. If the scanning module is so close to the objective lens that it is not necessary to relay through the lens when the illumination light is enabled to enter the objective lens as much as possible to illuminate the sample in a suitable scanning range of the scanning module, the relay optical path can also be omitted.

The objective lens is an optical device with a focusing function. It is called an objective lens because it is close to an object (i.e., a sample) to be imaged. Specifically, the objective lens includes lenses of different structures such as single lenses, glued lenses, lens assemblies and the like, includes lenses of different focusing modes such as refractive lenses, reflective lenses, diffractive lenses and the like, and includes lenses of different surface types such as curved lenses, gradient index lenses and the like.

The function of the spatial demodulation module is to significantly split the spatial position of the signal light emitted by the sample at different illumination focus (or one-dimensionally focused illumination line) positions in the object-side of the objective lens in spatial position, thereby performing detection respectively. Preferably, the spatial demodulation module is composed of a focusing lens and a perforated mirror. The perforated mirror is a mirror having a through hole, preferably a planar mirror. The hole of the perforated mirror and a certain illumination focus of the object-side of the objective lens are in a positionally object-image conjugated relationship. The object-image relationship is composed of an imaging system consisting of all optical devices in the process of signal light propagation to the pinhole, and in the simplest case, the imaging system includes (without considering the planar mirror in the optical path) the focusing lens, a relay optical path, and the objective lens in the spatial demodulation module. There are a plurality of illumination focuses (or one-dimensionally focused illumination lines) in the object-side of the objective lens, and each focus (or one-dimensionally focused illumination line) generates a path of signal light. Before the signal light enters the spatial demodulation module, several paths of the signal light overlap in space, making it difficult to distinguish them. Since the hole of the perforated mirror and a certain illumination focus of the object-side of the objective lens are in an object-image conjugated relationship, the signal light emitted by samples at other illumination focus positions in the object-side of the objective lens certainly cannot pass through the pinhole smoothly, so most of the signal light emitted from these other positions is reflected by the perforated mirror, and thus, the signal light emitted from the object point which is in an object-image conjugated relationship with the pinhole can be demodulated by using the perforated mirror. When there are only two paths of signal light, demodulation can be performed by using one perforated mirror; and when there are N paths of signal light, demodulation can be performed by using N-1 perforated mirrors. When there are multiple paths of signal light, a combination of the focusing lens and the perforated mirror is used, and each path of signals is sequentially demodulated by using the feature that the pinhole of the perforated mirror and the object point of a certain path of signal are in the object-image conjugated relationship. After demodulation, each path of signal light finally has a different propagation path in space. When the illumination is not focal point illumination but focus line illumination, the pinhole in the mirror is changed to a slit that is positionally in an object-image conjugated relationship with the focal line of illumination. The pinhole and the slit are positionally in an object-image conjugated relationship with the illumination point or illumination line of the object-side, but do not need to strictly satisfy the object-image conjugated relationship in geometrical dimensions. The perforated (or slit) mirror neither can ensure a certain path of signal to absolutely pass through the pinhole (or slit), nor can ensure other paths of signals to absolutely not pass through the pinhole (or slit) and be reflected, but should ensure that the signal intensity of the part of the corresponding path of signal passing through the pinhole (or slit) is greater than the signal intensity of the reflected part, and that the signal intensity of the reflected part of other paths of signals is greater than that of the part passing through the pinhole (or slit). The spatial demodulation module includes a passive type and an active type. The passive spatial demodulation module is composed of passive devices (such as mirrors, lenses and other passive optical components), and the active spatial demodulation module is composed of active devices (such as digital micromirror devices and other active devices). When the spatial demodulation module is composed of the active devices, the active devices are controlled by the control-acquisition-processing module. In summary, no matter which device is used specifically, the principle of spatial demodulation is that: there are multiple paths of light, and the focusing position of each path is different; a device is used to select a certain path separately, so that this path is propagated in a certain direction, and the other paths are propagated in other directions, ensuring that the propagation path of this path is split from that of the other paths in space, thereby demodulating this path separately, demodulating the multiple paths of light sequentially, and finally distinguishing all the paths. Of course, if a device can only demodulate one path of signal, it is inevitable to perform demodulation sequentially using the abovementioned cascade manner. If the device per se has the function of parallel demodulation of multiple paths, it is also possible to perform parallel demodulation directly or parallel and cascade mixed demodulation. A device does not have to completely demodulate one or several paths of signals, as long as it can distinguish the multiple paths of signals to some extent, and each path of signals can be demodulated by cascading multiple devices. After demodulation, the propagation paths of the paths of signals finally do not overlap in space, or the spatial energy distribution of each path of signals does not overlap (or has only little overlap).

The detection module is configured to independently detect each path of signals demodulated by the spatial demodulation module. The detection module is mainly composed of photodetectors, including area array photodetectors (area array CCD detectors and area array CMOS detectors), line array photodetectors (line array CCD detectors and line array CMOS detectors), photomultiplier tubes, photodiodes, and other devices capable of converting an optical signal into an electrical signal. The number of detectors in the detection module is based on the number of signal channels required. Preferably, in addition to the detectors, the detection module further includes other devices beneficial to signal detection. For example, when the signal light is propagated to the position of a photosensitive surface of the detector such that a light spot is so large to cause signal loss, a focusing lens is placed in front of the detector to reduce the light spot; when the signal light is fluorescence, a cut-off filter is placed in front of the detector to avoid interference of light other than a fluorescent band; and when there is interference of other paths of signal light having no significant difference in wavelength from this path of signal light in space, a combination of the focusing lens and the pinhole is used, so that this path of signal light enters the detector after passing through the pinhole, thereby inhibiting interference.

The functions of the control-acquisition-processing module include: controlling all active devices (mainly the scanner in the scanning module, and also including active devices in other modules) to operate in the imaging process; acquiring signals output by the detector, including signal amplification, filtering, analog-to-digital conversion and other operations, such that the original signal output by the detector changes to enable data processing; and processing the acquired signals, including splicing, grey level transformation and other operations, such that the acquired data is displayed or stored in the form of images or other data.

An imaging process of the parallel multi-region imaging method according to an embodiment of the present invention is as follows: the illumination light is emitted by the light source module 1, passes through the preprocessing module 2 to achieve a suitable beam diameter, optical power or polarization state, then enters the multi-focus generation module 3. The multi-focus generation module 3 modulates the illumination light to generate two or more sub-beams of different directions or focusing degrees, and then the illumination light is continuously propagated to the spectroscope 4, is transmitted to the scanning module 5 after passing through the spectroscope 4, is propagated to the objective lens 7 through the relay optical path 6, and forms two or more focuses (or one-dimensionally focused illumination lines) in the object-side through the objective lens 7. After the illumination light is irradiated onto the sample 0, signal light is generated on the sample 0 by reflection, scattering or fluorescence effects and the like. The signal light is collected by the objective lens 7 and is propagated to the scanning module 5 through the relay optical path 6. The scanning module 5 performs scanning under the control of the control-acquisition-processing module 10, the signal light is propagated to the spectroscope 4 through the scanning module 5. The spectroscope continuously propagates the signal light along a spatial path different from the illumination light, then the signal light enters the spatial demodulation module 8, the spatial demodulation module 8 spatially splits each path of signal light that is generated by each illumination sub-beam on the sample, the detection module 9 detects the paths of signal light after splitting, and the control-acquisition-processing module 10 acquires and processes electrical signals output by the detection module 9 and finally displays or stores the processed electrical signals in the form of images or other data.

Figure 2:
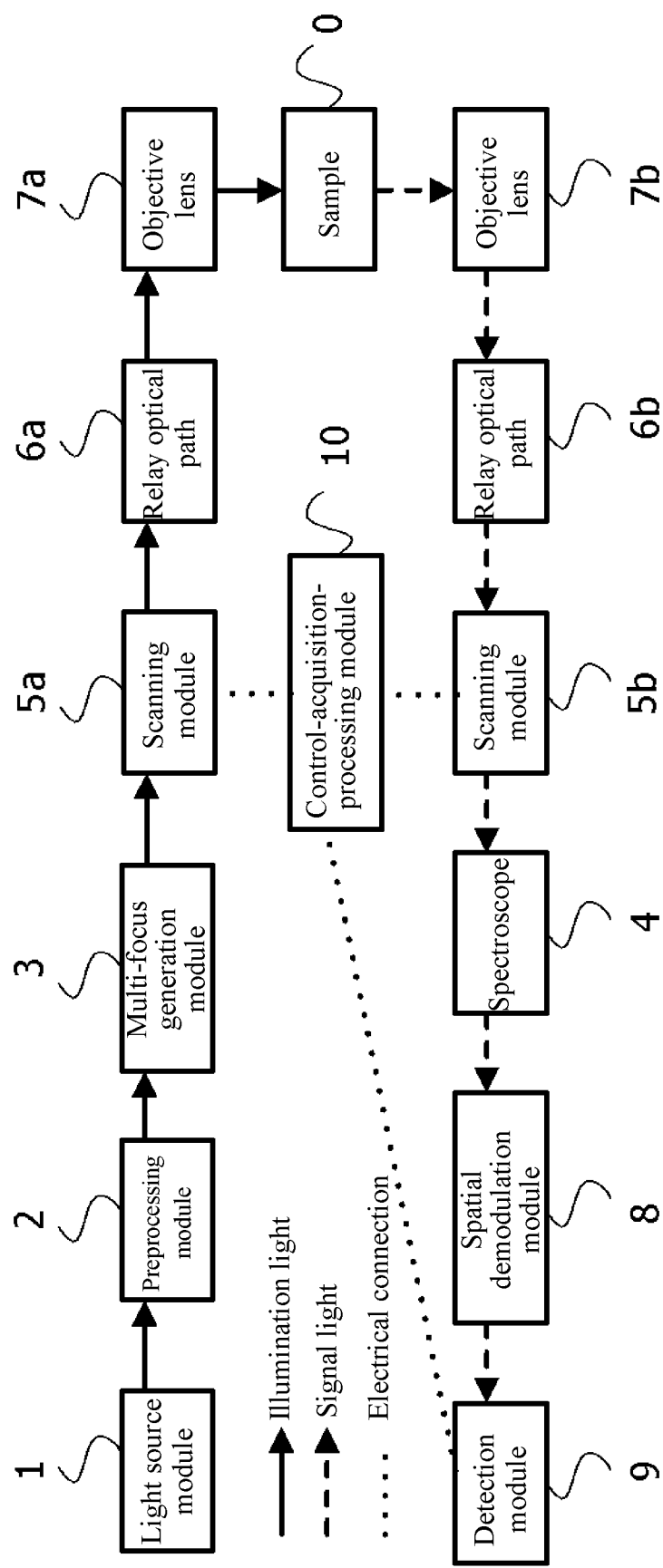
FIG. 2 is a structure diagram of another device according to an embodiment of the present invention.

The above structure and imaging process use the same objective lens for both illumination and signal light collection. As shown in FIG. 2, embodiments of the present invention also include other forms of structures and imaging processes, for example, using two objective lenses for illumination and signal light collection respectively. The variation of the structure lies in the numbers of the scanning modules, the relay optical paths and the objective lenses are two respectively, and the spectroscope is disposed behind the second scanning module. The imaging process is: the illumination light is emitted by the light source module 1, passes through the preprocessing module 2 to achieve a suitable beam diameter, optical power or polarization state, enters the multi-focus generation module 3, and is modulated by the multi-focus generation module 3 to generate two or more sub-beams of different directions or focusing degrees, and then the illumination light is continuously propagated to a first scanning module 5a, is propagated to a first objective lens 7a through a first relay optical path 6a, and forms two or more focuses (or one-dimensionally focused illumination lines) in the object space through the first objective lens 7a. After the illumination light is irradiated onto the sample 0, signal light is generated on the sample 0 by reflection, scattering or fluorescence effects and the like. The signal light is collected by a second objective lens 7b and is propagated to a second scanning module 5b through a second relay optical path 6b, the second scanning module 5b performs scanning under the control of the control-acquisition-processing module 10, the illumination light is then propagated to the spectroscope 4 through the second scanning module 5b. The spectroscope 4 filters out a part of the illumination light that is aliased with the signal light, then the signal light is propagated to the spatial demodulation module 8. The spatial demodulation module 8 spatially splits each path of signal light that is generated by each illumination sub-beam on the sample. The detection module 9 detects the paths of signal light after splitting, and the control-acquisition-processing module 10 acquires and processes electrical signals output by the detection module 9 and finally displays or stores the processed electrical signals in the form of images or other data.

For the structure of a single objective lens, based on the principle of reversibility of a light path, the spatial position of the signal light after passing through the scanning module does not change with the scanning of the scanning module, which is called back scanning. For the structure of two objective lenses, the scanning process of the second scanning module 5b and the first scanning module 5a should be synchronized to implement the effect of back scanning. The function of the spectroscope 4 is also changed, and only filtering out the illumination light that is aliased with the signal light is needed.

Figure 3:
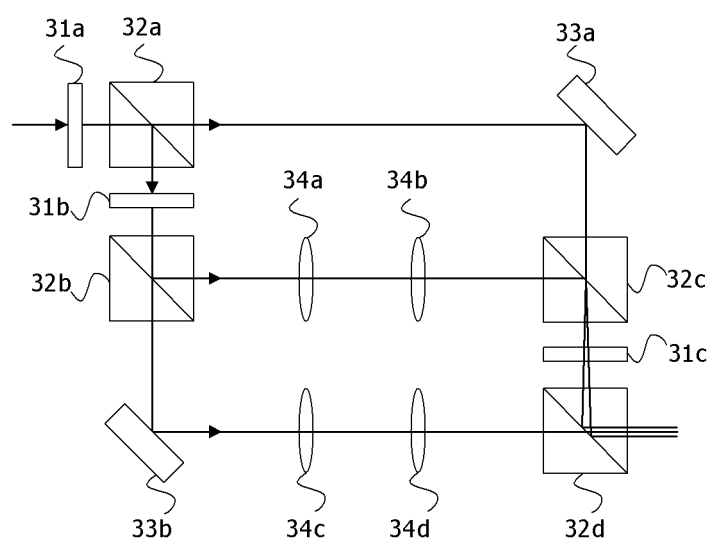
FIG. 3 is a structure diagram of a multi-focus generation module according to an embodiment of the present invention.

A specific implementation 1 of the multi-focus generation module according to an embodiment of the present invention is shown in FIG. 3. A half-wave plate 31a is disposed in front of a polarizing beam splitting prism 32a. The polarizing beam splitting prism 32a splits input light into a reflected beam and a transmitted beam, and the half-wave plate 31a is used to adjust an energy ratio of the reflected beam to the transmitted beam of the polarizing beam splitting prism 32a. A half-wave plate 31b is disposed in front of a polarizing beam splitting prism 32b, the polarizing beam splitting prism 32b splits the reflected light of the polarizing beam splitting prism 32a into two beams, and the half-wave plate 31b is used to adjust an energy ratio of the reflected light to the transmitted light of the polarizing beam splitting prism 32b. By using the beam splitting effects of the polarizing beam splitting prisms 32a and 32b, three sub-beams are finally obtained. Among them, a first sub-beam is not modulated by a lens, a second sub-beam is modulated by a lens 34a and a lens 34b, a third sub-beam is modulated by a lens 34c and a lens 34d, and the direction and focusing/divergence degree of the modulated beam are changed. The first sub-beam is reflected by a mirror 33a, and the third sub-beam is reflected by a mirror 33b. The first sub-beam is transmitted through a polarizing beam splitting prism 32c, the second sub-beam is reflected by a polarizing beam splitting prism 32c. The first and second sub-beams are combined, and then is modulated by a half-wave plate 31c to the polarization state. The function of the half-wave plate 31c is to take a suitable polarization state of the combined beam of the first and second sub-beams, such that the combined beam is reflected by a polarizing beam splitting prism 32d. The third sub-beam is transmitted by the polarizing beam splitting prism 32d. After passing through the polarizing beam splitting prism 32d, the three sub-beams are all combined. At this time, although the directions and divergence or focusing degrees of the three sub-beams are not the same, there is still a large overlap in space.

Figure 4:
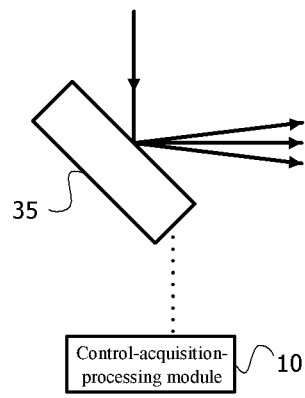
FIG. 4 is a structure diagram of another multi-focus generation module according to an embodiment of the present invention.

A specific implementation 2 of the multi-focus generation module according to the embodiment of the present invention is shown in FIG. 4. The spatial light modulator 35 generates a specific modulation pattern under the control of the control-acquisition-processing module 10. Different modulation patterns can generate different multi-focus distributions. Specifically, the phase modulation distribution that varies linearly with space is used to change the direction of emergent light, and the phase modulation pattern distributed in the form of a lens modulation function with space is used to change the focusing or divergence degree of the emergent light (the lens modulation function is circularly symmetrical, and its circle center position can also be used to change the direction of the emergent light).

Figure 5:
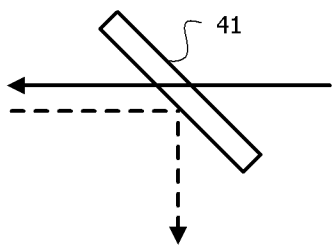
FIG. 5 is a structure diagram of a spectroscope according to an embodiment of the present invention.

A specific implementation 1 of the spectroscope according to the embodiment of the present invention is shown in FIG. 5. A dichroic film 41 has different reflectances and transmittances for light of different wavelengths, and is characterized by having a high transmittance for long-wavelength light and having a high reflectance for short-wavelength light, so that the propagation paths of light of different wavelengths are different.

Figure 6:
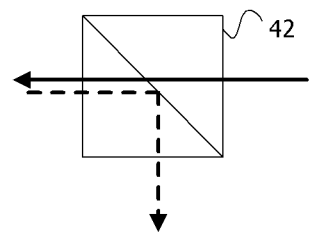
FIG. 6 is a structure diagram of another spectroscope according to an embodiment of the present invention.

A specific implementation 2 of the spectroscope according to the embodiment of the present invention is shown in FIG. 6. A polarizing beam splitting prism 42 has different reflectances and transmittances for light of different polarization state, and is characterized by having a high transmittance for light having a polarization state of p and having a high reflectance for light having a polarization state of s, so that the propagation paths of light of different wavelengths are different.

Figure 7:
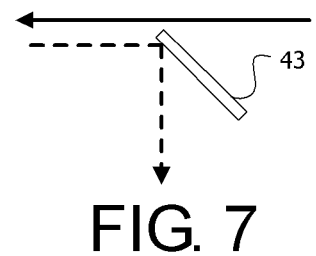
FIG. 7 is a structure diagram of another spectroscope according to an embodiment of the present invention.

A specific implementation 3 of the spectroscope according to the embodiment of the present invention is shown in FIG. 7. An edge of a mirror 43 is disposed between two beams, so that it reflects one path of light, and the other path is continuously propagated without being blocked, thereby making the light of which the propagation path does not overlap in space further split in space.

Figure 8:
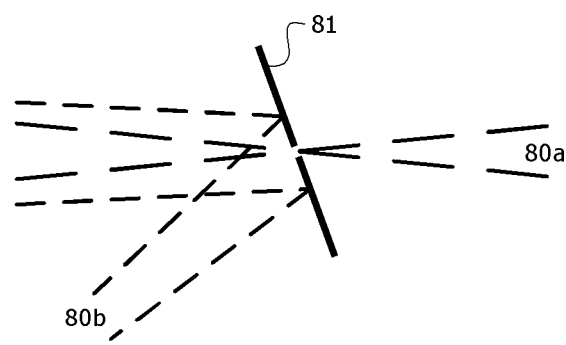
FIG. 8 is a structure diagram of a spatial demodulation module according to an embodiment of the present invention.

A specific implementation 1 of the spatial demodulation module according to the embodiment of the present invention is shown in FIG. 8. The middle of a mirror surface of the perforated mirror 81 has a pinhole permeable to light. There are two paths of light in space, one path has a focus that overlaps with the pinhole of the perforated mirror 81, such that this path may pass through the pinhole to be continuously propagated, and the other path has a focus that does not overlap with the pinhole of the perforated mirror 81, such that most energy of this path may be reflected by the mirror. A beam 80a that finally passes through the pinhole and the reflected beam 80b no longer overlap in space.

Figure 9:
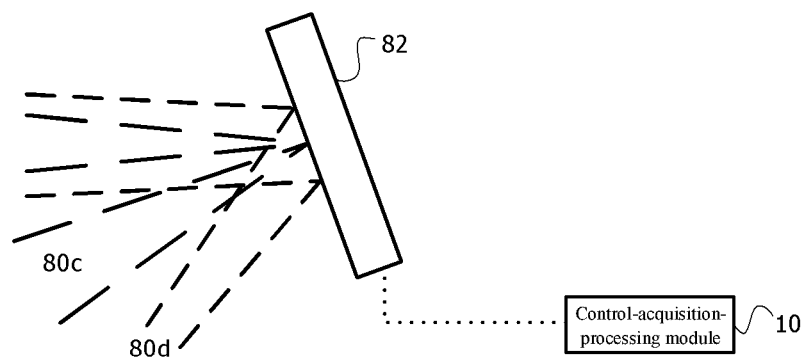
FIG. 9 is a structure diagram of another spatial demodulation module according to an embodiment of the present invention.

A specific implementation 2 of the spatial demodulation module according to the embodiment of the present invention is shown in FIG. 9. A digital micromirror device 82 generates a specific modulation pattern under the control of the control-acquisition-processing module 10. There are two paths of light in space, one path is focused on a working surface of the digital micromirror device 82, a micromirror at the focus position of this path in the digital micromirror device 82 is deflected to one state, and other micromirrors are deflected to another state; and thus, the path of light focused to the digital micromirror device 82 is reflected by the digital micromirror device 82 to a certain direction, and the other path of light is reflected to another direction, thereby finally forming beams 80c and 80d that do not overlap in space.

Figure 10:
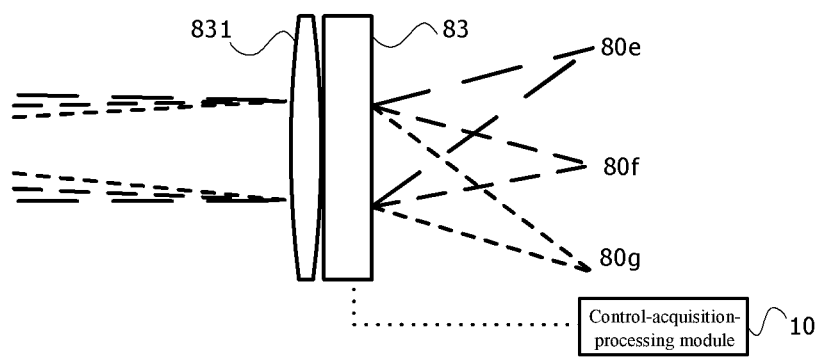
FIG. 10 is a structure diagram of another spatial demodulation module according to an embodiment of the present invention.

A specific implementation 3 of the spatial demodulation module according to the embodiment of the present invention is shown in FIG. 10. A spatial light modulator 83 generates a specific modulation pattern under the control of the control-acquisition-processing module 10. There are three paths of light in space, and they have different focusing degrees. The pattern on the spatial light modulator 83 is a deformed grating (off-axis Fresnel zone plate or off-axis holographic lens) that cooperates with a lens 831 to diffract three paths of light of different focusing degrees to different diffraction orders, thereby finally forming beams 80e, 80f and 80g that do not overlap in space.

Figure 11:
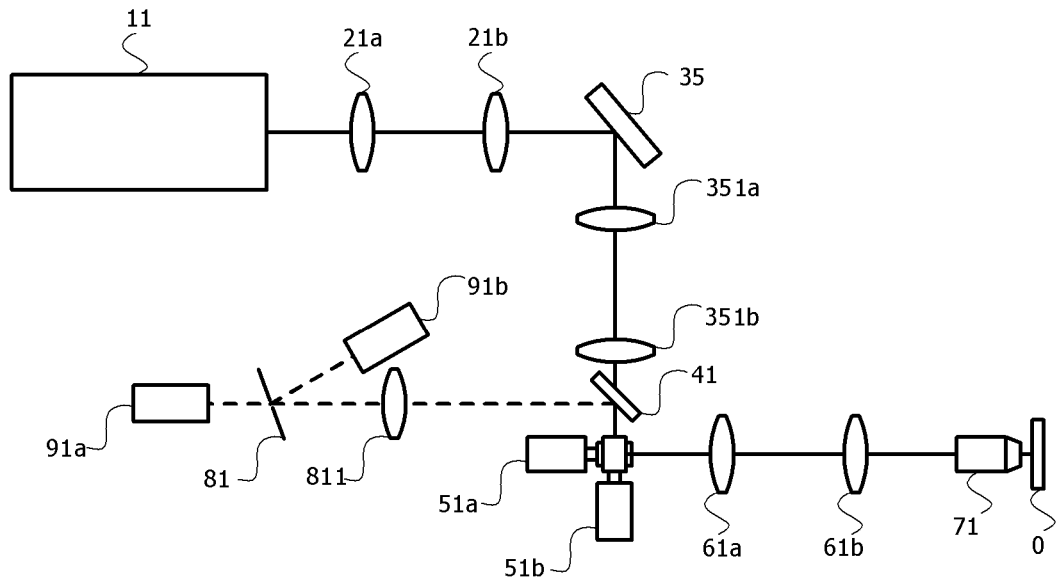
FIG. 11 is a structure diagram of a device according to an embodiment of the present invention.

A specific implementation 1 of an overall structure according to the embodiment of the present invention is shown in FIG. 11. Laser light emitted by a femtosecond laser 11 is expanded by a preprocessing module composed of a lens 21a and a lens 21b and is then incident on the spatial light modulator 35, and the spatial light modulator modulates the wave front to generate two focuses. A multi-focus beam is relayed through a lens 351a and a lens 351b and passes through the dichroic mirror 41, and then is incident on a two-axis scanning module composed of a galvanometer mirror 51a and a galvanometer mirror 51b, after being scanned by the scanning module, it is incident on an objective lens 71 through a relay lens 61a and a relay lens 61b, and is focused on the sample 0 through the objective lens 71. The femtosecond laser generates fluorescence in the sample, a fluorescence signal is collected by the objective lens 71, returns along a path, and is finally incident on the dichroic mirror 41 and reflected by the dichroic mirror 41. After the reflected light is focused by a lens 811, one path of light passes through the pinhole of the perforated mirror 81 and is detected by a photomultiplier tube 91a, and another path is reflected by the perforated mirror 81 and is detected by a photomultiplier tube 91b. The control-acquisition-processing module is not shown in the figure. The spatial light modulator 35 and the galvanometer mirrors 51a and 51b are all controlled by the control-acquisition-processing module, and output signals of the photomultiplier tubes 91a and 91b are acquired by the control-acquisition-processing module.

Figure 12:
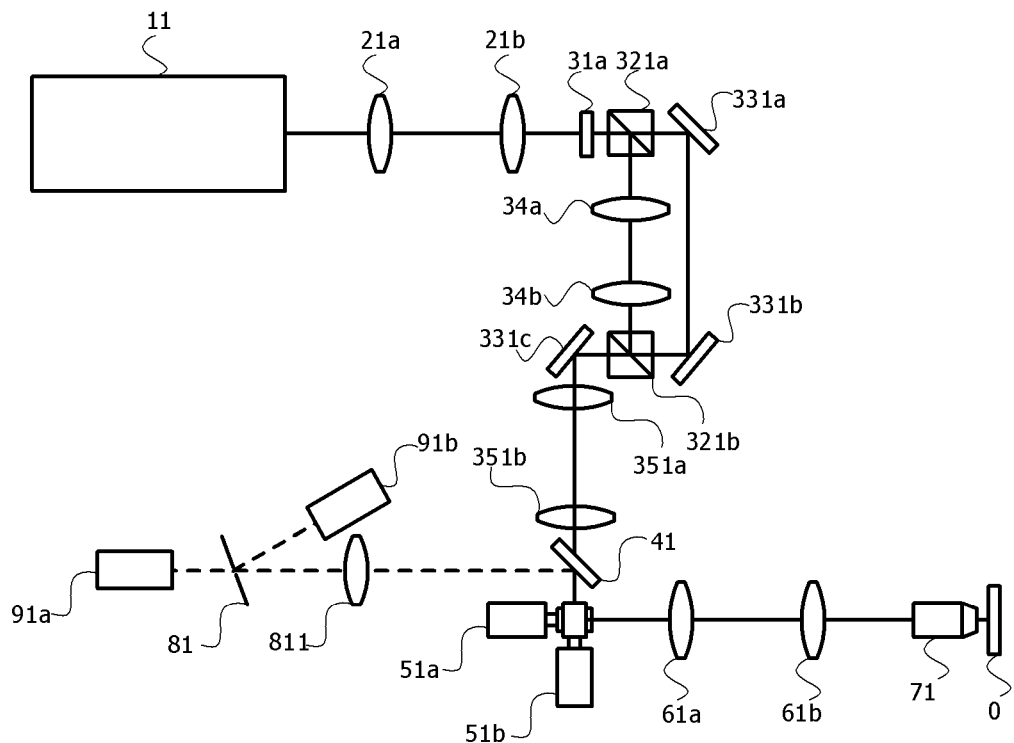
FIG. 12 is a structure diagram of another device according to an embodiment of the present invention.

A specific implementation 2 of the overall structure according to the embodiment of the present invention is shown in FIG. 12. The laser light emitted by the femtosecond laser 11 is expanded by the preprocessing module composed of the lens 21a and the lens 21b, and is incident on a polarizing beam splitting prism 321a after the polarization state is adjusted by the half-wave plate 31a. The polarizing beam splitting prism 321a splits the light into two paths, one path is incident on a polarizing beam splitting prism 321b after the convergence and divergence degrees are adjusted by the lens 34a and the lens 34b, the other path is reflected by reflective mirrors 331a and 331b and also incident on the polarizing beam splitting prism 321b, and the polarizing beam splitting prism 321b combines the two paths of light. The combined light is reflected by a reflective mirror 331c, relayed by the lens 351a and the lens 351b, incident on the two-axis scanning module composed of the galvanometer mirror 51a and the galvanometer mirror 51b after passing through the dichroic mirror 41, after being scanned by the scanning module, it is incident on the objective lens 71 through the relay lens 61a and the relay lens 61b, and is focused on the sample 0 through the objective lens 71. The femtosecond laser generates fluorescence in the sample, a fluorescence signal is collected by the objective lens 71, returns along a path, and is finally incident on the dichroic mirror 41 and reflected by the dichroic mirror 41. After the reflected light is focused by a lens 811, one path of light passes through the pinhole of the perforated mirror 81 and is detected by a photomultiplier tube 91a, and the other path is reflected by the perforated mirror 81 and is detected by a photomultiplier tube 91b. The control-acquisition-processing module is not shown in the figure. The galvanometer mirrors 51a and 51b are both controlled by the control-acquisition-processing module, and output signals of the photomultiplier tubes 91a and 91b are acquired by the control-acquisition-processing module.

Figure 13:
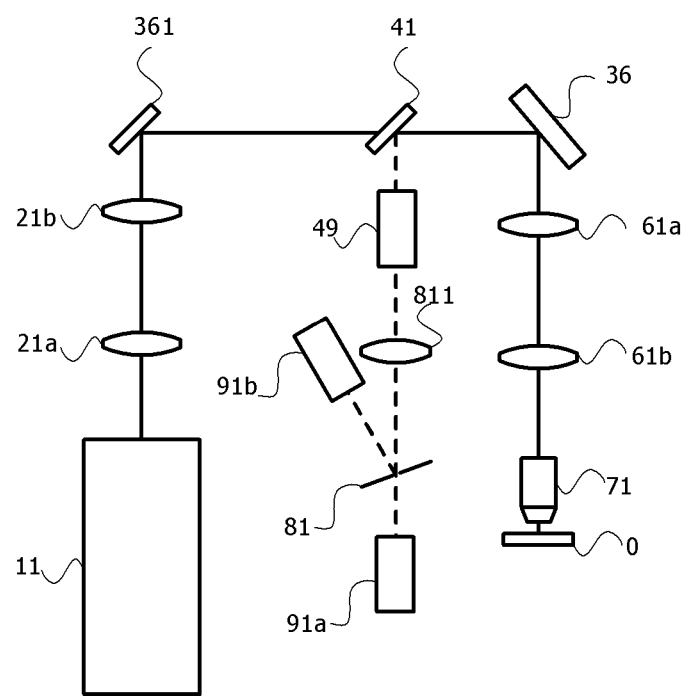
FIG. 13 is a structure diagram of another device according to an embodiment of the present invention.

A specific implementation 3 of the overall structure according to the embodiment of the present invention is shown in FIG. 13. The laser light emitted by the femtosecond laser 11 is expanded by the preprocessing module composed of the lens 21a and the lens 21b and incident on a reflection grating 361. The reflection grating 361 is used to compensate spatial dispersion of a digital micromirror device 36, emergent light of the reflection grating 361 is incident on the digital micromirror device 36 after passing through the dichroic mirror 41, and the digital micromirror device 36 simultaneously implements the functions of multi-focus generation and scanning. After passing through the digital micromirror device 36, light is incident on the objective lens 71 through the relay lenses 61a and 61b, and is focused by the objective lens 71 to the focus. The femtosecond laser generates fluorescence in the sample, a fluorescence signal is collected by the objective lens 71, returns along the path, and is finally incident on the dichroic mirror 41 and is reflected by the dichroic mirror 41. After the reflected light is compensated by a dispersion compensation module 49 and is focused by the lens 811. One path of light passes through the pinhole of the perforated mirror 81 and is detected by the photomultiplier tube 91a, and the other path is reflected by the perforated mirror 81 and detected by the photomultiplier tube 91b. The control-acquisition-processing module is not shown in the figure. The digital micromirror device 36 is controlled by the control-acquisition-processing module, and output signals of the photomultiplier tubes 91a and 91b are acquired by the control-acquisition-processing module.

Figure 14:
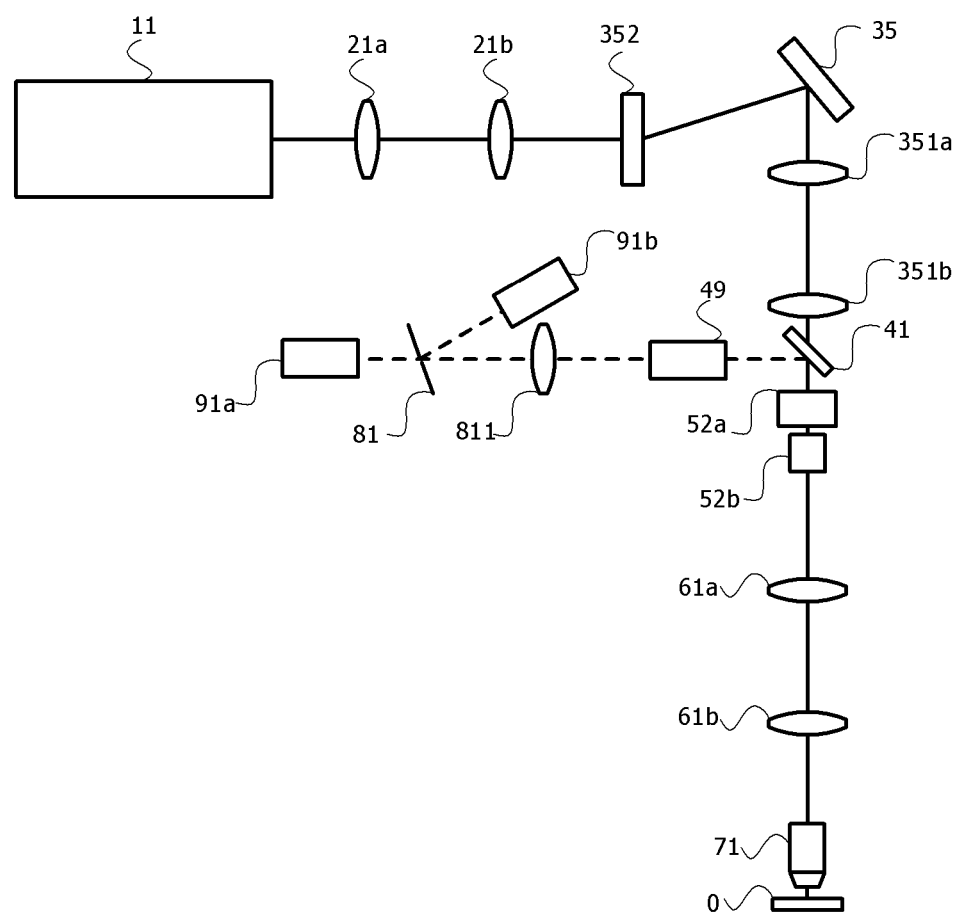
FIG. 14 is a structure diagram of another device according to an embodiment of the present invention.

A specific implementation 4 of the overall structure according to the embodiment of the present invention is shown in FIG. 14. The laser light emitted by the femtosecond laser 11 is expanded by the preprocessing module composed of the lens 21a and the lens 21b and then is incident on a transmission grating 352. The transmission grating 352 is used to compensate the spatial dispersion of the spatial light modulator 35, emergent light of the transmission grating 352 is incident on the spatial light modulator 35. The spatial light modulator modulates the wave front to generate two focuses. A multi-focus beam is relayed by the lens 351a and the lens 351b, passes through the dichroic mirror 41, and is incident on a double-axis scanning module composed of an acousto-optic deflector 52a and an acousto-optic deflector 52b, after being scanned by the scanning module, incident on the objective lens 71 through the relay lens 61a and the relay lens 61b, and is focused onto the sample 0 through the objective lens 71. The femtosecond laser generates fluorescence in the sample, a fluorescence signal is collected by the objective lens 71, returns along a path, and is finally incident on the dichroic mirror 41 and reflected by the dichroic mirror 41. After the reflected light is compensated by the dispersion compensation module 49 and focused by the lens 811, one path of light passes through the pinhole of the perforated mirror 81 and is detected by the photomultiplier tube 91a, and the other path is reflected by the perforated mirror 81 and detected by the photomultiplier tube 91b. The control-acquisition-processing module is not shown in the figure. The spatial light modulator 35 and the acousto-optic deflectors 52a and 52b are all controlled by the control-acquisition-processing module, and output signals of the photomultiplier tubes 91a and 91b are acquired by the control-acquisition-processing module.

Figure 15:
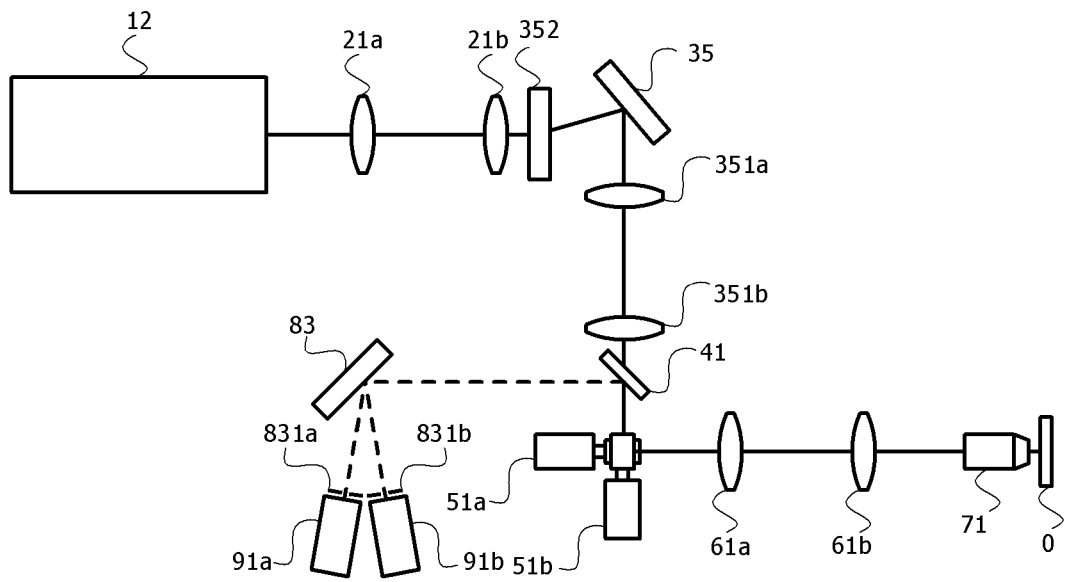
FIG. 15 is a structure diagram of another device according to an embodiment of the present invention.

A specific implementation 5 of the overall structure according to the embodiment of the present invention is shown in FIG. 15. The laser light emitted by the femtosecond laser 11 is expanded by the preprocessing module composed of the lens 21a and the lens 21b and then is incident on the transmission grating 352. The transmission grating 352 is used to compensate the spatial dispersion of the spatial light modulator 35, the emergent light of the transmission grating 352 is incident on the spatial light modulator 35. The spatial light modulator modulates the wave front to generate two focuses. A multi-focus beam is relayed by the lens 351a and the lens 351b, passes through the dichroic mirror 41, and is incident on the double-axis scanning module composed of the galvanometer mirror 51a and the galvanometer mirror 51b, after being scanned by the scanning module, incident on the objective lens 71 through the relay lens 61a and the relay lens 61b, and is focused onto the sample 0 through the objective lens 71. The femtosecond laser generates fluorescence in the sample, a fluorescence signal is collected by the objective lens 71, returns along a path, and finally incident on the dichroic mirror 41 and reflected by the dichroic mirror 41. The reflected light is incident on the digital micromirror device 83, and the digital micromirror device 83 generates a deformed grating (off-axis Fresnel zone plate), so that one path of light is focused to a pinhole 381a and detected by the photomultiplier tube 91a, and the other path is focused to a pinhole 831b and detected by the photomultiplier tube 91b. The control-acquisition-processing module is not shown in the figure. The spatial light modulator 35, the galvanometer mirrors 51a and 51b, and the digital micromirror device 83 are all controlled by the control-acquisition-processing module, and simultaneously, output signals of the photomultiplier tubes 91a and 91b are acquired by the control-acquisition-processing module.

Figure 16:
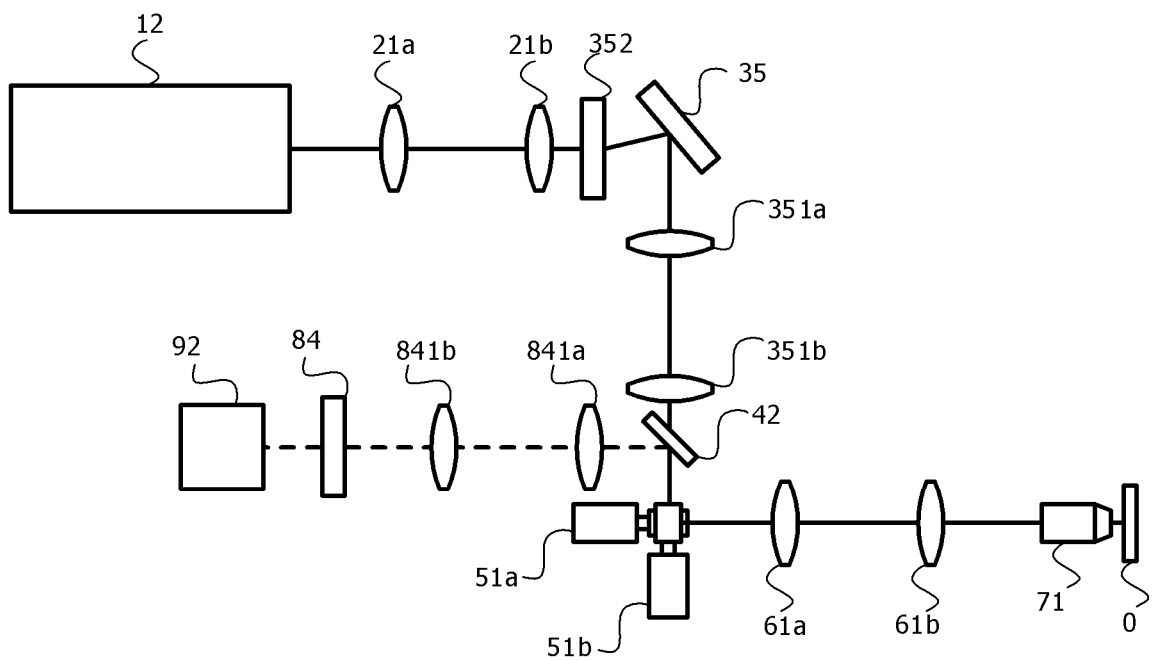
FIG. 16 is a structure diagram of another device according to an embodiment of the present invention.

A specific implementation 6 of the overall structure according to the embodiment of the present invention is shown in FIG. 16. The laser light emitted by a femtosecond laser 11 is expanded by the preprocessing module composed of the lens 21a and the lens 21b, and is then incident on a transmission grating 352. The transmission grating 352 is used to compensate the spatial dispersion of the spatial demodulator 35. The emergent light of the transmission grating 352 is incident on the spatial light modulator 35, the spatial light modulator modulates the wave front to generate multiple focuses, and the multi-focus beam is relayed by the lens 351a and the lens 351b, passes through the dichroic mirror 41, and is incident on a double-axis scanning module composed of a galvanometer mirror 51a and a galvanometer mirror 51b, scanned by the scanning module, incident on the objective lens 71 through the relay lens 61a and the relay lens 61b, and focused onto the sample 0 through the objective lens 71. The femtosecond laser generates fluorescence in the sample, a fluorescence signal is collected by the objective lens 71, returns along a path, and is finally incident on the dichroic mirror 41 and reflected by the dichroic mirror 41. The reflected light is relayed by the lens 841a and the lens 841b and incident on a modulator 84. A modulation function of the modulator 84 is an n-th order function of space coordinates (n≥2), which can be expressed as $t(x, y) = Ae^{i[a(x^n+y^n)+b]}$, where A is an intensity modulation function and defaults to a real constant, and a and b are real constants. When n=2, the modulator appears a lens. When n=3, the emergent light of the modulator 84 appears as an Airy beam. The modulator 84 is a passive modulation device that is fabricated from a transparent material. The modulator 84 may also be a spatial light modulator or a digital micromirror device. When the modulator 84 is the digital micromirror device, its pattern is a binarization result of the modulation function, for example, cosine is taken for a phase, and then binarized according to a threshold. After passing through the modulator 84, the light exhibits a characteristic of focusing. If the axial positions of the multiple focuses generated by the spatial light modulator 35 are the same, then when n=2, that is, when the modulator 84 is a lens, the different focuses can be focused on the same plane and are in different horizontal positions. If the multiple focuses generated by the spatial light modulator 35 have different axial positions, the lens is directly used for focusing, a defocused light spot and a focused light spot may overlap, and spatial demodulation cannot be performed. Therefore, taking n>2, the focal depth of the focused light spot behind the modulator 84 is greater than the focal depth of the lens focus under the same numerical aperture, so that the phenomenon of overlapping of the defocused light spot and the focused light spot is eliminated, and different focuses have different horizontal positions after focusing. Different focuses are focused on the same plane and have different horizontal positions, thereby implementing spatial demodulation. A detector 92 is located in a focal region behind the modulator 84, and at this time, the signal light appears on the detector 92 as focused light spots having different horizontal positions. The detector 92 is an array detector, such as a multi-anode photomultiplier tube, an array avalanche diode, an area array CMOS sensor, an area array CCD sensor, etc., so that signals of different focused light spots can be acquired. The control-acquisition-processing module is not shown in the figures. The spatial light modulator 35, the galvanometer mirrors 51a and 51b and other active devices are all controlled by the control-acquisition-processing module, and output signals of the detector 92 are acquired by the control-acquisition-processing module.

Those skilled in the art will readily understand that the above description is only the exemplary embodiments of the present invention, and is not intended to limit the present invention. Any modifications, equivalent substitutions and improvements made within the spirit and principle of the present invention shall fall within the protection scope of the present invention.

What is claimed is:

1. A parallel multi-region imaging device, comprising: a multi-focus generation module, a spatial demodulation module, and a detection module;

the multi-focus generation module being configured to modulate illumination light to generate a plurality of focuses in an object-side of an objective lens, and to form a plurality of different illumination regions, thereby generating multiple paths of signal light through a sample to be imaged;

the spatial demodulation module being configured to make spatial energy distribution of each path of signal light no longer overlap or make an overlapping region smaller than a target requirement; and the detection module being configured to independently detect each path of signal light passing through the spatial demodulation module, so as to implement parallel multi-region imaging, the parallel multi-region imaging device further comprising a spectroscope between the multi-focus generating module and the spatial demodulation module, wherein the spectroscope is configured to spatially separate the illumination light and signal light returned from the sample to be imaged, so that the illumination light output by the multi-focus generation module is propagated to the sample to be imaged and meanwhile the signal light returned from the sample to be imaged is propagated to the spatial demodulation module, wherein a beam splitting method of the spectroscope includes splitting based on wavelength, splitting based on polarization state, splitting based on spatial position, and attenuation type splitting.

2. The parallel multi-region imaging device according to claim 1, further comprising a scanning module behind the spectroscope, wherein the scanning module is configured to change a propagation direction, a divergence degree or a convergence degree of a beam, so that a focus of the object-side of the objective lens or a one-dimensionally focused line changes position in space, thereby performing scanning.

3. The parallel multi-region imaging device according to claim 2, wherein a scanning member in the scanning module includes reflective type, transmissive type, or diffractive type.

4. The parallel multi-region imaging device according to claim 1, further comprising a relay optical path, wherein the relay optical path is configured to implement pupil matching between the scanning module and the objective lens, so as to enable the illumination light to enter the objective lens to illuminate the sample to be imaged within a target scanning range of the scanning module.

5. The parallel multi-region imaging device according to claim 1, further comprising a relay optical path, wherein the relay optical path is configured to implement pupil matching between the scanning module and the objective lens, so as to enable the illumination light to enter the objective lens to illuminate the sample to be imaged within a target scanning range of the scanning module.

6. The parallel multi-region imaging device according to claim 1, further comprising a relay optical path, wherein the relay optical path is configured to implement pupil matching between the scanning module and the objective lens, so as to enable the illumination light to enter the objective lens to illuminate the sample to be imaged within a target scanning range of the scanning module.

7. The parallel multi-region imaging device according to claim 2, further comprising a relay optical path, wherein the relay optical path is configured to implement pupil matching between the scanning module and the objective lens, so as to enable the illumination light to enter the objective lens to illuminate the sample to be imaged within a target scanning range of the scanning module.

8. The parallel multi-region imaging device according to claim 3, further comprising a relay optical path, wherein the relay optical path is configured to implement pupil matching between the scanning module and the objective lens, so as to enable the illumination light to enter the objective lens to illuminate the sample to be imaged within a target scanning range of the scanning module.

* * * * *